(12) United States Patent
Enqvist et al.

(10) Patent No.: US 10,932,160 B2
(45) Date of Patent: Feb. 23, 2021

(54) ADAPTIVE TRAFFIC PROCESSING IN COMMUNICATIONS NETWORK

(71) Applicant: Comptel Oy, Helsinki (FI)

(72) Inventors: Juhana Enqvist, Espoo (FI); Simo Isomaki, Vantaa (FI); Mikko Jarva, Helsinki (FI)

(73) Assignee: Comptel Oy, Helsinki (FI)

( * ) Notice: Subject to any disclaimer, the term of this patent is extended or adjusted under 35 U.S.C. 154(b) by 80 days.

(21) Appl. No.: 16/467,447

(22) PCT Filed: Dec. 7, 2017

(86) PCT No.: PCT/FI2017/050869
§ 371 (c)(1),
(2) Date: Jun. 6, 2019

(87) PCT Pub. No.: WO2018/104588
PCT Pub. Date: Jun. 14, 2018

(65) Prior Publication Data
US 2020/0100145 A1 Mar. 26, 2020

(30) Foreign Application Priority Data

Dec. 8, 2016 (MY) .......................... PI2016704577

(51) Int. Cl.
*H04W 28/24* (2009.01)
*H04W 4/50* (2018.01)
(Continued)

(52) U.S. Cl.
CPC ......... *H04W 28/24* (2013.01); *H04L 12/1407* (2013.01); *H04W 4/12* (2013.01); *H04W 4/24* (2013.01); *H04W 4/50* (2018.02)

(58) Field of Classification Search
CPC ...... H04W 28/24; H04W 4/50; H04L 12/1407
See application file for complete search history.

(56) References Cited

U.S. PATENT DOCUMENTS 8,055,603 B2 * 11/2011 Angell .................. G06N 5/025
706/47
9,479,523 B2 * 10/2016 Altman ............... H04L 63/1416
(Continued)

FOREIGN PATENT DOCUMENTS

WO 2018104588 A1 6/2018

OTHER PUBLICATIONS

Nguyen, et al.; "A Survey of Techniques for Internet Traffic Classification using Machine Learning"; IEEE Communications Surveys & Tutorials, vol. 10, No. 4, Fourth Quarter; 2008; pp. 56-76.
(Continued)

*Primary Examiner* — Zhiren Qin

(57) ABSTRACT

There is provided adaptive traffic processing in a communications network. Traffic flows from real-life traffic are detected, rules are applied to detected traffic flows, machine-learning based clustering of the detected traffic flows is performed, at least one new traffic rule is generated on the basis of one or more generated traffic clusters, the generated rules are simulated for obtaining a result indicating behavioural effect in the traffic of the communications network, the result is evaluated against one or more performance criteria of the communications network and the generated rules are applied if the performance criteria of the communications network have been met.

19 Claims, 6 Drawing Sheets

(51) Int. Cl.
*H04L 12/14* (2006.01)
*H04W 4/12* (2009.01)
*H04W 4/24* (2018.01)

(56) References Cited

U.S. PATENT DOCUMENTS

| | | | |
|---|---|---|---|
| 9,582,662 B1* | 2/2017 | Messick | G06F 21/554 |
| 2006/0031472 A1* | 2/2006 | Rajavelu | H04L 63/0263 |
| | | | 709/224 |
| 2010/0082316 A1* | 4/2010 | Chawla | H04L 41/0869 |
| | | | 703/13 |
| 2010/0153316 A1 | 6/2010 | Duffield et al. | |
| 2011/0125509 A1 | 5/2011 | Lidstrom et al. | |
| 2013/0329552 A1 | 12/2013 | Carnero Ros et al. | |
| 2015/0127243 A1* | 5/2015 | Jang | G08G 1/0116 |
| | | | 701/117 |
| 2015/0339376 A1* | 11/2015 | Wieweg | G06F 40/20 |
| | | | 707/739 |
| 2016/0112240 A1* | 4/2016 | Sundaresan | H04W 4/90 |
| | | | 726/1 |
| 2016/0350683 A1* | 12/2016 | Bester | H04L 49/20 |
| 2016/0359915 A1* | 12/2016 | Gupta | H04L 63/20 |

OTHER PUBLICATIONS

McGregor, et al.; "Flow Clustering Using Machine Learning Techniques"; Lecture Notes in Computer Science; International Workshop on Passive and Active Network Measurement (PAM 2004); Berlin, Heidelberg; Springer, vol. 3015; 2004; 10 pgs.

"3rd Generation Partnership Project; Technical Specification Group Services and System Aspects; Policy and charging control architecture (Release 13)"; 3GPP TS 23.203 V13.9.9; Technical Specification; http://www.3gpp.org; Sep. 2016; pp. 1-246.

Enqvist, et al.; "Adaptive Traffic Processing in Communications Network"; MY Application No. PI2016704577; Filed Dec. 8, 2016; 36 pgs.

* cited by examiner

ADAPTIVE TRAFFIC PROCESSING IN COMMUNICATIONS NETWORK

CROSS-REFERENCE TO RELATED APPLICATION

This application is the National Stage of, and therefore claims the benefit of, International Application No. PCT/FI2017/050869 filed on Dec. 7, 2017, entitled "ADAPTIVE TRAFFIC PROCESSING IN COMMUNICATIONS NETWORK," which was published in English under International Publication Number WO 2018/104588 on Jun. 14, 2018, and further claims the benefit of MY Application No. PI2016704577 filed on Dec. 8, 2016. The above applications are commonly assigned with this National Stage application and are incorporated herein by reference in their entirety.

FIELD

The present disclosure relates to adaptive traffic processing in a communications network and more particularly adaptive traffic processing of traffic flows.

BACKGROUND

Communications networks serve traffic of various characteristics. The characteristics can be caused by capabilities of devices used for communications, applications executed on the devices and users' behaviour. Changes to the characteristics of the traffic served by the communications network can be rapid, since new applications for smart phones are adopted very quickly by the users.

Long Term Evolution (LTE) is a new network scheme recommended by the 3rd Generation Partnership Project (3GPP). In an LTE network, all communications are carried over an IP channel from user equipment (UE) to an all-IP core called the Evolved Packet Core (EPC). The EPC then provides gateway access to other networks while ensuring an acceptable Quality of Experience (QoE) and charging a subscriber for their particular network activity.

The 3GPP generally describes the components of the EPC and their interactions with each other in a number of technical specifications. Specifically, 3GPP TS 23.203, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof. The 3GPP specification allows the Policy and Charging Control (PCC) architecture to interwork with older generation networks (e.g., General Packet Radio Service (GPRS)). For example, 3GPP TS 29.212 and 3GPP TS 29.214 provide some guidance on the establishment of an application session by the EPC upon receipt of an application request from an Application Function (AF) in the form of an AA-Request (AAR) message or from a Packet Data Network Gateway (P-GW) in the form of a Credit Control Request (CCR) message. The standards specify that the PCRF is responsible for receiving new service requests, creating new PCC rules commensurate with such requests, and providing these new PCC rules to a Policy and Charging Enforcement Function (PCEF) for installation. The 3GPP standards also define the format of service request messages and PCC rules.

Due to the changing characteristics of the traffic served by the communications networks, the PCC can be lacking behind since there are no policy and charging control defined for the new traffic. Defining policy and charging control for new traffic introduced to the communications network involves not only time consuming manual work but requires deep technical understanding of the configuration and operating the communications network. Therefore, even after policy and charging control was successfully defined for the new traffic this would likely be late for example considering the time it takes users new mobile applications to reach a significant distribution among user base. Moreover, applying the policy and charging control that considers the new traffic involves a risk regarding user experience and service level of other traffic served by the communications network.

SUMMARY OF THE INVENTION

The invention is defined by the features of the independent claims. Some specific embodiments are defined in the dependent claims.

According to a first aspect of the present invention, there is provided a system for adaptive traffic processing in a communications network, said system comprising a memory for storing program code and at least one processing core capable of executing the program code to cause detecting traffic flows from real-life traffic, applying rules to detected traffic flows, performing machine-learning based clustering of the detected traffic flows, generating at least one new traffic rule on the basis of one or more generated traffic clusters, simulating the generated rules for obtaining a result indicating behavioural effect in the traffic of the communications network, evaluating the result against one or more performance criteria of the communications network, and applying the generated rules if the performance criteria of the communications network have been met.

According to a second aspect of the present invention, there is provided a method for adaptive traffic processing in a communications network, comprising detecting traffic flows from real-life traffic, applying rules to detected traffic flows, performing machine-learning based clustering of the detected traffic flows, generating at least one new traffic rule on the basis of one or more generated traffic clusters, simulating the generated rules for obtaining a result indicating behavioural effect in the traffic of the communications network, evaluating the result against one or more performance criteria of the communications network, and applying the generated rules if the performance criteria of the communications network have been met.

According to a third aspect of the present invention, there is provided a system comprising: means for detecting traffic flows from real-life traffic, means for applying rules to detected traffic flows, means for performing machine-learning based clustering of the detected traffic flows, means for generating at least one new traffic rule on the basis of one or more generated traffic clusters, means for simulating the generated rules for obtaining a result indicating behavioural effect in the traffic of the communications network, means for evaluating the result against one or more performance criteria of the communications network, and means for applying the generated rules if the performance criteria of the communications network have been met.

According to a fourth aspect of the present invention, there is provided a non-transitory computer readable medium having stored thereon a set of computer readable instructions that, when executed by at least one processor, cause a system to at least: detecting traffic flows from real-life traffic, applying rules to detected traffic flows, performing machine-learning based clustering of the detected traffic flows, generating at least one new traffic rule on the basis of one or more generated traffic clusters, simulating the generated rules for obtaining a result indicating behavioural effect in the traffic of the communications network, evaluating the result against one or more performance criteria of the communications network, and applying the generated rules if the performance criteria of the communications network have been met.

According to a fifth aspect of the present invention, there is provided computer program configured to cause a method in accordance with a method the second aspect of the present invention.

Various embodiments of the first, second, third, fourth and fifth aspects may comprise at least one feature from the following bulleted list:

- traffic clustering is performed continuously and one or more previously generated traffic clusters are compared with one or more subsequently generated clusters to determine whether the previously generated traffic clusters include valid clusters and/or whether the subsequently generated clusters include new clusters
- the detected traffic flows are clustered into multiple clusters by applying a plurality of sets of weighing parameters to the detected traffic flow
- the machine-learning based clustering is adapted on the basis of previously generated traffic clusters and one or more simulation results
- a traffic flow control product is defined on the basis of the generated rules and a service offer for applying the defined traffic flow control product is sent to one or more subscribers of the communications network
- the generated rules are applied in response to receiving an acceptance from the subscriber on the service offer
- the acceptance from the subscriber on the service offer via one messaging channel is received via another messaging channel
- the service offer for the traffic flow control product is sent via a messaging channel, for example Short Message Service, push notification, in-app messaging, email and/or web page content on subscription management web pages
- system for adaptive traffic processing in the communications network is at least part of policy and charging control system in the communications network.

EMBODIMENTS

In connection with real-life traffic processing in a communications network, traffic flows are detected and rules are applied to the detected traffic flows. Machine-learning based clustering of the detected traffic flows is performed and at least one new traffic rule is generated on the basis of one or more traffic clusters generated by the machine-learning based clustering. The generated rules are simulated for obtaining a result indicating behavioural effect in the traffic of the communications network. The result is evaluated against one or more performance criteria of the communications network and the generated rules are applied if the performance criteria of the communications network have been met. A benefit of this is that traffic flow processing in the communications network may be adapted to changes in characteristics of the traffic by building rules that tap onto new traffic clusters.

Figure 1:
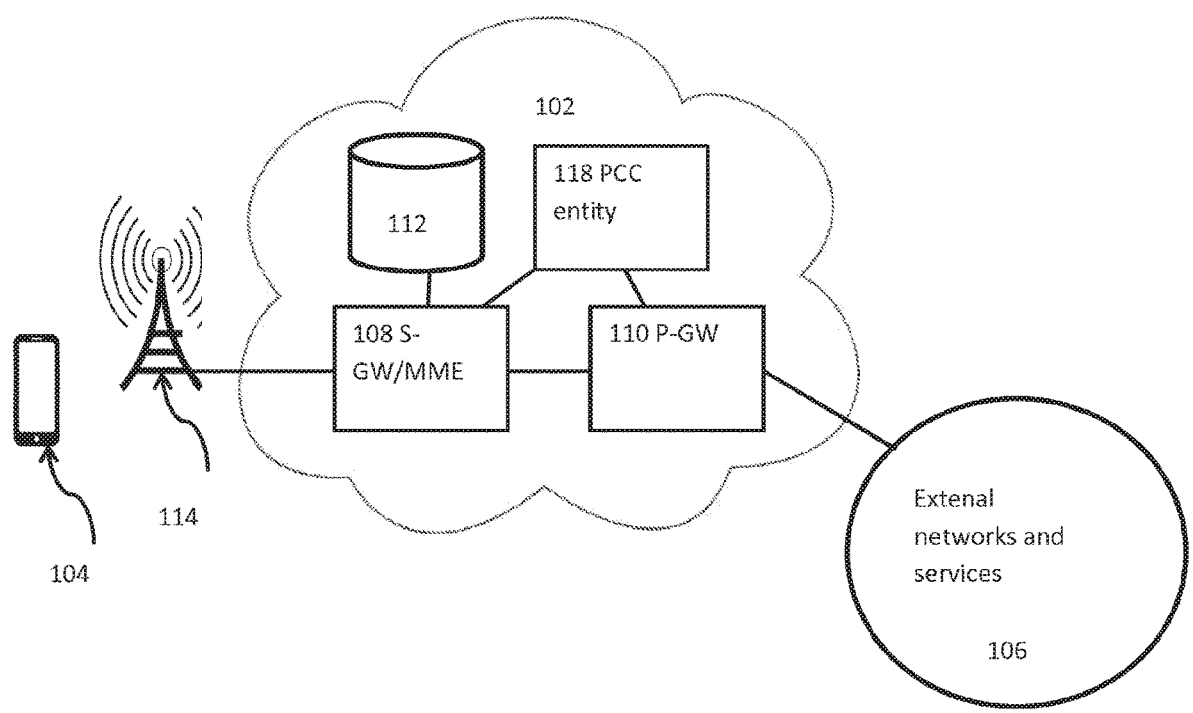
FIG. 1 illustrates an example architecture for a communications network in accordance with at least some embodiments of the present invention.

FIG. 1 illustrates an example architecture for a communications network in accordance with at least some embodiments of the present invention. A communications network according to the example architecture may comprise physical entities corresponding to the architecture and/or one or more entities represented in the architecture may be combined into a single entity in the communications network.

Referring now to the entities in FIG. 1, a communications network may comprise an access network 114 and a core network 102. User Equipment (UE) 104 may access the core network via the access network such that the UE may be provided services in the communications network.

Examples of the services provided to the UE comprise voice calls, video calls, short message services, multimedia message services and data transfer to name a few. The service of the communications network may be provided to the UE according to a subscription of the UE. The subscription may define services provided to the UE in the communications network and charging policies to be applied to the UE. The subscription may be provided to the UE by an operator of the communications network. Services provided by the communications network may be referred to as native services.

The core network 102 may comprise one or more traffic processing entities 108, 110, a subscriber database 112 and a Policy and Charging Control (PCC) entity 118. The traffic processing entities may be capable of detecting traffic flows and applying rules to traffic flows. A traffic flow may comprise user plane data that is carried between the UE and external networks and services 106. In general a traffic flow may refer to traffic between a source entity and a destination entity of the traffic. The traffic flow may be established over a plurality of link layer connections over which data packets of the traffic flow may be associated with the originating and destination entities by identifying information. The identifying information may comprise addresses of the source entity and address of the destination entity. The data packets may be IP packets, whereby the identifying information may comprise IP addresses and other information derivable from the IP packets.

The traffic processing entities may connect the access network to the core network, and the core network to external networks and services 106. Examples of the traffic processing entities comprise a Serving Gateway (S-GW) and a Packet Data Network Gateway (P-GW). An S-GW co-located and/or integrated with a Mobility Management Entity may be referred to S-GW/MME. An example of the subscriber database is a Home Subscriber Server (HSS). The PCC system may be capable of traffic flow based charging and policy control. The traffic flow based policy and charging control may comprise generating traffic rules and applying the rules to detected traffic flows by provisioning the generated rules to the traffic processing entities. In this way functionalities of the communications network such as traffic flow based charging, including charging control and online credit control, as well as policy control (e.g. gating control, QoS control, QoS signalling, etc.) may be facilitated. A Policy and Charging Rules Function (PCRF) may serve as the PCC system, for example.

The access network 114 may be a wireless or wired access network. Wired access networks may be Digital Subscriber Lines or local area networks for example. The wired access network may connect the UE to the communications network by optical fiber, copper coaxial cable or a twisted pair. Wireless access networks may connect UE to the communications networks by radio frequency communications or light wave communications for example infrared communications. The radio frequency communications may be provided by a base station that is connected to the core network. The base station may be a cellular base station. The cellular base station may be an access node of a cellular communications network and have one or more cells via which the UE may access the communications network.

The access network 114 may be capable of providing Internet Protocol connectivity and the access network may be referred to an IP connectivity Access network (IP-CAN). In IP-CAN traffic flows are IP flows, whereby IP packet processing may be applied to the traffic flows.

The external networks and services 106 may provide the UE services that are not provided by the communications network the UE has the subscription to. Service provided by the external networks and services may be referred to non-native services as opposed to the native services provided by the communications network the UE has subscription to. The services provided by the external networks and services may utilize the native services of the communications network, for example a data transfer service.

Connections between the entities of the communications network may be provided by wireless and wired connections that may be provided by hardware, and/or software implementations. In an example implementation, the communications network may be according to 3GPP Release 8 specifications or later, whereby the access network is a Long Term Evolution (LTE) access network and the core network is an Evolved Packet Core (EPC). Entities of the LTE and EPC may be implemented according to the 3GPP Specifications.

Figure 2:
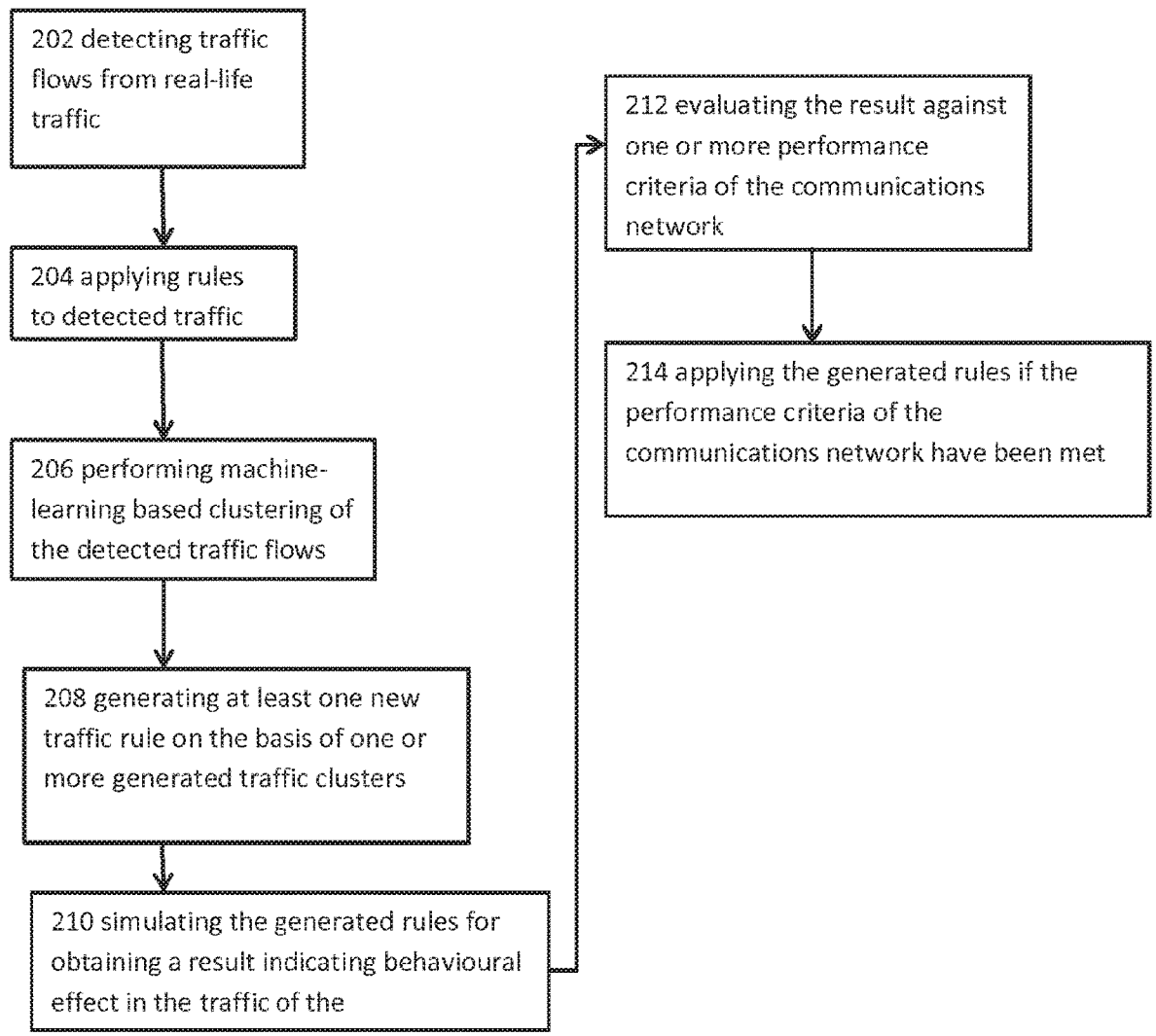
FIG. 2 is a flow graph of method in accordance with at least some embodiments of the present invention.

FIG. 2 is a flow graph of method in accordance with at least some embodiments of the present invention. The phases of the illustrated method may be performed in a PCC system 118 or in a control device configured to control the functioning of the PCC system.

Phase 202 comprises detecting traffic flows from real-life traffic. Phase 204 comprises applying rules to detected traffic flows. Phase 206 comprises performing machine-learning based clustering of the detected traffic flows. Phase 208 comprises generating at least one new traffic rule on the basis of one or more generated traffic clusters. Phase 210 comprises simulating the generated rules for obtaining a result indicating behavioural effect in the traffic of the communications network. Phase 212 comprises evaluating the result against one or more performance criteria of the communications network. Phase 214 comprises applying the generated rules if the performance criteria of the communications network have been met. A benefit of this is that traffic flow processing in the communications network may be adapted to changes in characteristics of the traffic by building rules that tap onto new traffic clusters.

The real-life traffic may refer to traffic from the communications network that is in production mode, i.e. the communications network is serving live traffic. The real-life traffic may comprise traffic originating from a new application being executed in UE. The new application may have specific traffic characteristics regarding bandwidth, delay, jitter, transmission direction, transmission time and/or application user. In order to properly serve the application traffic and the user, the traffic flow of the application should be detected in the communications network and rules should be generated for the traffic flow. When the traffic rules are simulated and evaluated against one or more performance criteria, the rules generated for the application may be evaluated before they are put to production and applied to the traffic flow.

In an example the rules generated in phase 208 are PCC rules. The PCC rules may apply to a service data flow. The service data flow may be a traffic data flow that is specific to a native service or a non-native service. The PCC rules enable detecting packets belonging to a service data flow, policy control of the service data flow and charging control of the service data flow. The PCC rule may comprise a service data flow filter (SDF) for detecting packets belonging to a specific service data flow. The packets may be IP packets, whereby the SDF filter may be based on packet header characteristics that may include source and destination addresses, protocol identifier, Type of Service, Traffic class, Flow label, IPSec Security Parameter Index, to name a few.

It should be appreciated that the machine-learning based clustering may generate one or more clusters and the generated clusters may form a cluster map spanned by two, three, or more dimensions of traffic flow parameters.

Figure 3:
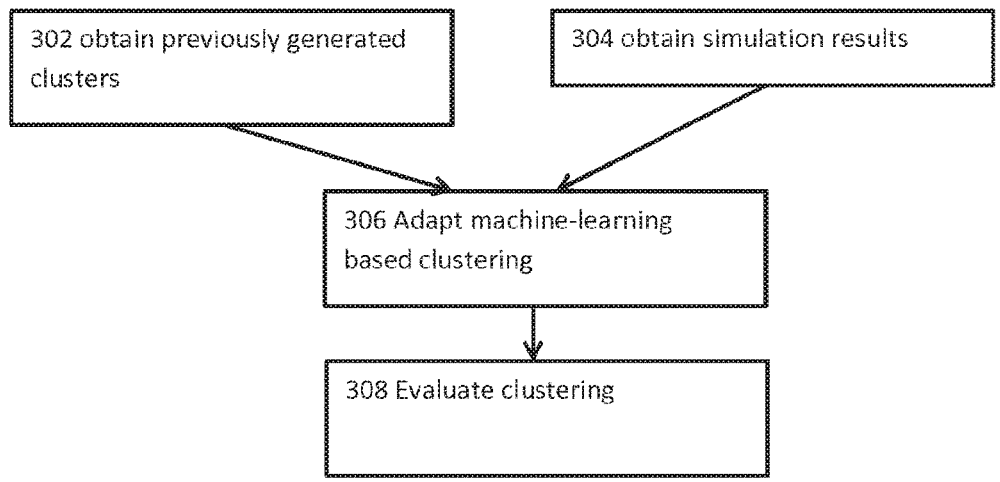
FIG. 3 is a flow graph of method in accordance with at least some embodiments of the present invention.

FIG. 3 is a flow graph of method in accordance with at least some embodiments of the present invention. The phases of the illustrated method may be performed in a PCC system 118 or in a control device configured to control the functioning of the PCC. The method provides adapting machine-learning based clustering. Alternatively or additionally the method provides detecting invalid clusters which may be stored into history as outdated clusters. In this way the number of processed clusters may be controlled and operational efficiency of the system may be maintained or even improved. In one example the phases may be performed in connection with performing machine-learning based clustering in phase 206 in the method of FIG. 2.

Phase 302 comprises obtaining previously generated clusters. Phase 304 comprises obtaining simulation results. Phase 306 comprises adapting machine-learning based clustering on the basis of the previously generated traffic clusters and one or more simulation results. Phase 308 comprises evaluating clustering generated by the adapted machine-learning.

In an example, in phase 304 the simulation results may be obtained from phase 206 in FIG. 2 for adapting the machine-learning in phase 306. The previously generated clusters may be cluster maps that represent a previous current state of the system before performing the phases 206 to 214, where the system enters a new state where the clusters generated in phase 206 and rules applied in phase 214 form the new current state of the system. The evaluation of the clustering in phase 308 may be performed in phases 208 to 212 such that a decision of applying the generated rules may be made in phase 214.

Figure 4:
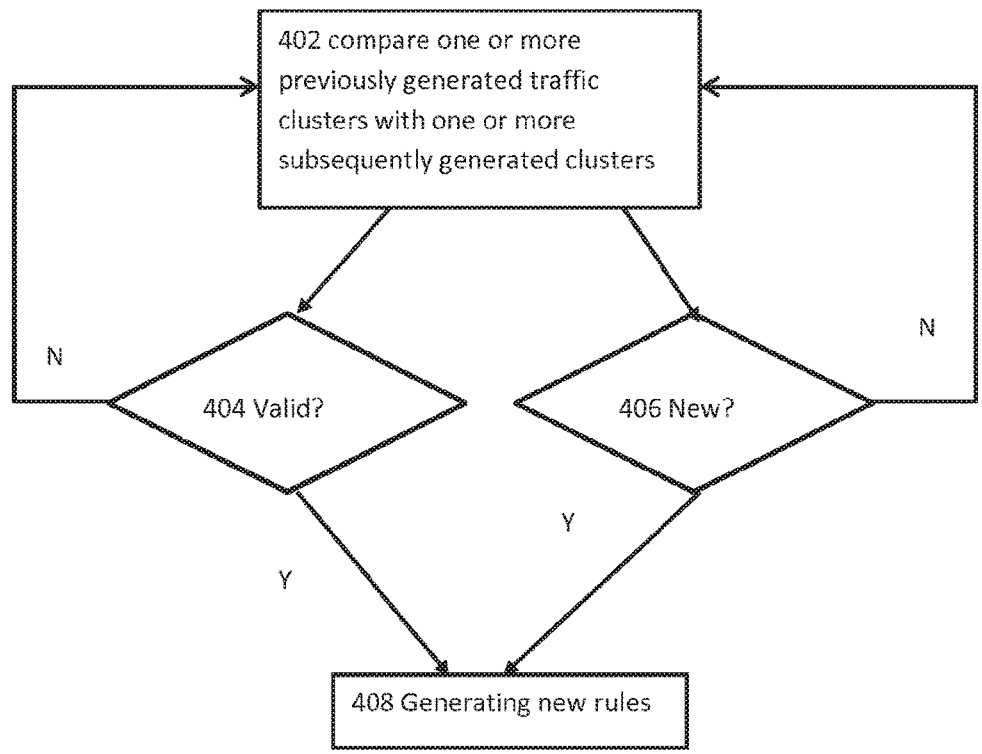
FIG. 4 is a flow graph of method in accordance with at least some embodiments of the present invention.

FIG. 4 is a flow graph of method in accordance with at least some embodiments of the present invention. The phases of the illustrated method may be performed in a PCC system 118 or in a control device configured to control the functioning of the PCC. The method facilitates selecting clusters for generating rules. In one example the phases may be performed in connection with performing machine-learning based clustering in phase 206 in the method of FIG. 2. The phases of the method in FIG. 4 may be performed on clustering generated by the machine-learning based clustering.

Phase 402 comprises comparing one or more previously generated traffic clusters with one or more subsequently generated clusters. The previously generated cluster may be stored such that they may be compared with the subsequently generated clusters.

Phase 404 comprises determining whether the previously generated traffic clusters include valid clusters and/or whether the subsequently generated clusters include new clusters. If the previously generated clusters are valid the method may proceed to phase 408. If the previously generated clusters are not valid, the method may proceed to phase 402, where further comparison of previously generated clusters and subsequently generated cluster may be made for a next set of previously generated clusters and subsequently generated clusters.

Phase 406 comprises determining whether the subsequently generated clusters include new clusters. If the subsequently generated clusters are new the method may proceed to phase 408. If the subsequently generated clusters are not new, the method may proceed to phase 402, where further comparison of previously generated clusters and subsequently generated cluster may be made for a next set of previously generated clusters and subsequently generated clusters. In one example if a new cluster substantially includes a previously generated cluster, the new cluster may replace and/or supplement the previously generated cluster.

Phase 408 may comprise generating at least one new traffic rule on the basis of the new clusters and the valid clusters. Particularly, the new traffic rule is generated if the new clusters are not overlapping with any or most of the valid clusters. In this way the new traffic will apply to traffic flows that have not been recognized earlier. Moreover, the new traffic rule is generated if the size of the new traffic cluster is greater than a threshold. The threshold may be a threshold for a cluster area in a cluster map spanned by two, three, or more dimensions of traffic flow parameters.

In one example, in a communications network with a relatively large number of valid clusters and a stabile situation as regards to native services and non-native services, the threshold for generating a new rule for may be defined by a cluster area that is smaller than any of the cluster areas of the valid clusters. In this way rules may be generated in phase 408 to new traffic clusters in a very early stage, where the cluster area of the new clusters is small.

It should be appreciated that the previously generated cluster may include history that includes invalid clusters that have been outdated. In an example, in phase 402 the one or more subsequently generated clusters may be compared first with valid clusters. If the subsequently generated clusters are not found in the valid clusters the subsequently generated clusters may be compared with invalid cluster in the history. If the subsequently generated clusters are found in the history, the subsequently generated cluster may be determined 404 invalid clusters and not new 406. Information indicating that the generated clusters are found in the history may be used to determine that an outdated cluster has re-emerged in the traffic. This information may be applied to simulating the traffic rules, whereby the simulation may produce information indicating changes in the users' behavior since the last time the outdated cluster was valid. In this In one example, in a communications network with valid clusters and a where new non-native services are increasingly being utilized by the UE, the threshold for generating a new rule for may be defined by a cluster area that is higher than the smallest cluster area of the valid clusters and less than the highest cluster area of the valid clusters. In this way in phase 408 rules may be generated to new traffic clusters in a stage, where the cluster area of the new clusters is significant with respect to the valid clusters. In one example the threshold may be defined as less than 30% of the median cluster area of the valid clusters.

Figure 5:
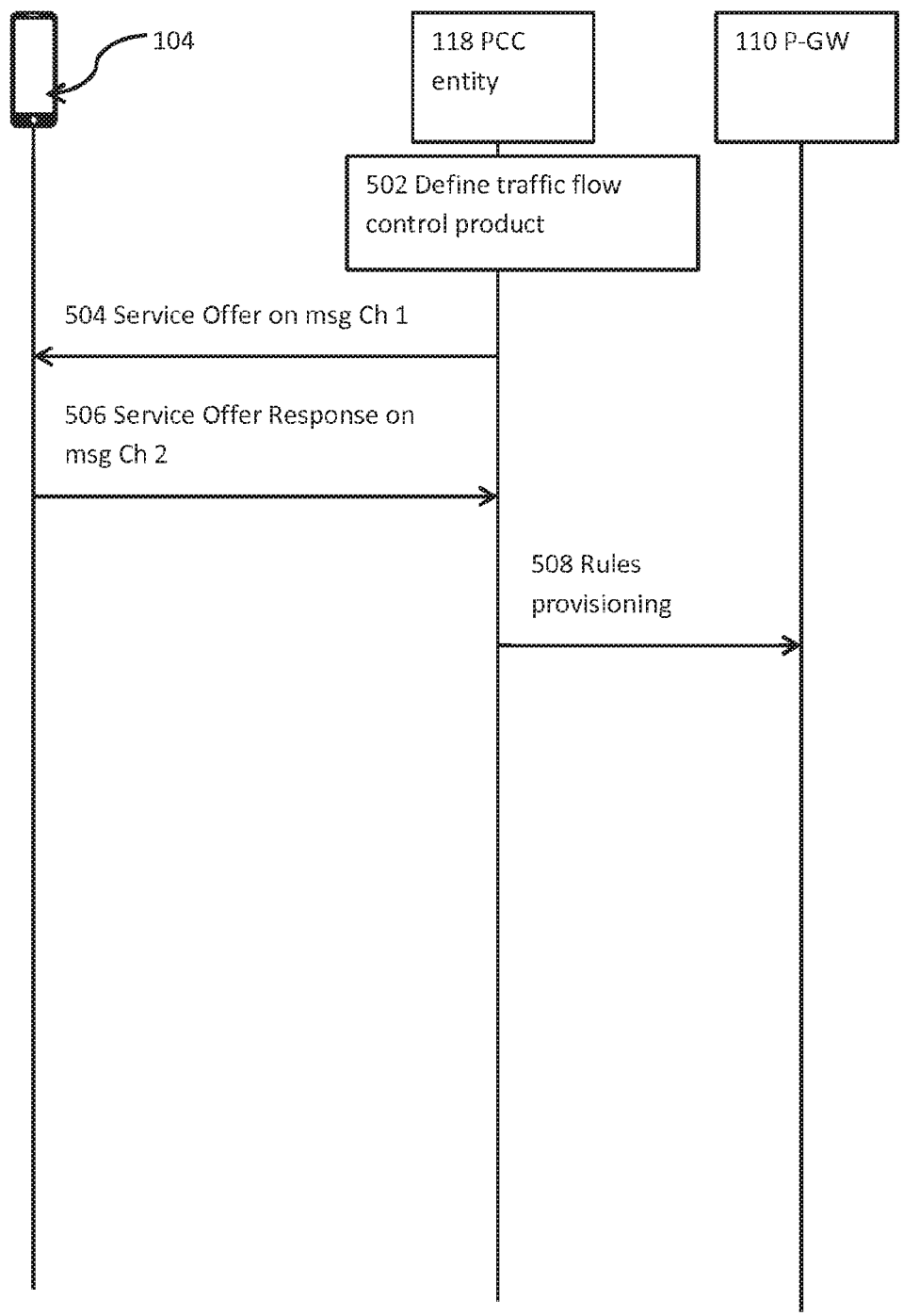
FIG. 5 illustrates a sequence in accordance with at least some embodiments of the present invention.

FIG. 5 illustrates a sequence in accordance with at least some embodiments of the present invention. The sequence illustrates functionalities performed by UE 104. PCC system 118 and a traffic processing entity P-GW 110 illustrated in FIG. 1.

Initially, UE may be provided a subscription to a communications network by an operator of the communications network and the communications network may have at least one traffic flow control product for controlling traffic flows of subscriptions of the communications network. The traffic flow product may be defined on the basis of the generated traffic rules. The rules may be provisioned in traffic processing entities of the communications network such that traffic flows may be processed according to the traffic flow control product associated with the subscription of the UE. The traffic flow control product may include one or more or a combination of properties from a group comprising: Uplink data amount, downlink data amount, uplink data rate, downlink data rate, uplink QoS, downlink QoS, allowed UE application, allowed external services, charging information. The properties may be specific to a time of day, week, month or a year. In this way the traffic flow control product may be used to apply different processing to the traffic flows on the basis of the properties of the traffic flow control product. The PCC system may be performing one or more phases of the method of FIG. 2, for example phase 206 of machine-learning based clustering of the detected traffic flows and phase 208 of generating at least one new traffic rule on the basis of one or more generated traffic clusters, whereby the traffic flows may be clustered.

In 502, the PCC system may define a traffic flow control product on the basis of the generated rules. A service offer 504 for applying the defined traffic flow control product is sent to one or more subscribers of the communications network. The service offer may be sent to the UE 104 of the subscribers over one or more messaging channels, Ch1, Ch2. After the service offer is received in the UE, the use may decide on accepting the offer and purchasing the traffic flow control product.

A response 506 may be sent from the UE to the PCC system in response to the service offer 504. The response may be sent using the same or different messaging channel as the service offer 504.

Examples of the messaging channel comprise Short Message Service, push notification, in-app messaging, email and/or web page content on subscription management web pages. The messaging channels may provide transmission of data, information and/or messages in one direction. e.g. from the communications network to the UE from the UE to the communications network, or in both directions between the UE and the communications network. A messaging channel may be available or unavailable. SMS may be available, when the UE is capable of accessing the communications network. On the other hand the SMS may be unavailable, if the UE is not within the coverage area of the base station. In-app messaging may be available, when the application (app) is being executed in the foreground in the UE and the user interface of the application is being displayed and has the user's attention. On the other hand the in-app messaging may be available only for one-way messaging and unavailable for the response from the UE to the communications network. Push notification may be available, when an application is executed in a background state, where the application does not have the user's attention and the user interface of the application is being displayed to the user. On the other hand the push notification may be available only for one-way messaging and unavailable for the response from the UE to the communications network. Email and subscription management web pages may be available when the UE is successfully authenticated. On the other hand, when credentials of the email or subscription management web pages are changed they may become unavailable.

In-app messaging, also known as in-app messages or in-app notifications, broadcasts messages to users when they are using the app on the UE, directly within the app itself. An in-app message may be a pop-up may be presented at the top, middle or bottom of the screen, where user interface of the app is displayed. In-app messages can include images and text, for example.

Push notifications are a type of message sent from an application to a platform, where the application is executed. The platform may be the operating system in the UE for example. In an example, push notifications may be used by an application to deliver pertinent information to the user of the UE. The push notifications may appear as alert-like messages on the home screen or in a notification area at the top of the screen in the user interface of the UE. It should be appreciated that the user does not have to be actively using the app to receive a push notification. Push notifications may be text-only, but they may instead of additionally comprise audio and/or video. The operating system, where the app is executed, may have settings that allow the user to opt-in to receiving push notifications and/or to turn them off.

When the response 506 is an acceptance of the service offer, the PCC system may apply the generated rules used for defining the traffic flow control product in response to receiving the acceptance from the UE. The generated rules may be applied by provisioning 508 the rules to the traffic processing entities 110 in the communications network.

In an embodiment the service offer 504 may be sent to the UE over one messaging channel (Ch1), and a response, such as an acceptance or rejection, is received via another messaging channel (Ch2). Since the service offer and response use different messaging channels the response may be received even if the messaging channel of the service offer is a one-way channel, the messaging channel of the service offer is congested or the messaging channel of the service offer is not available.

Figure 6:
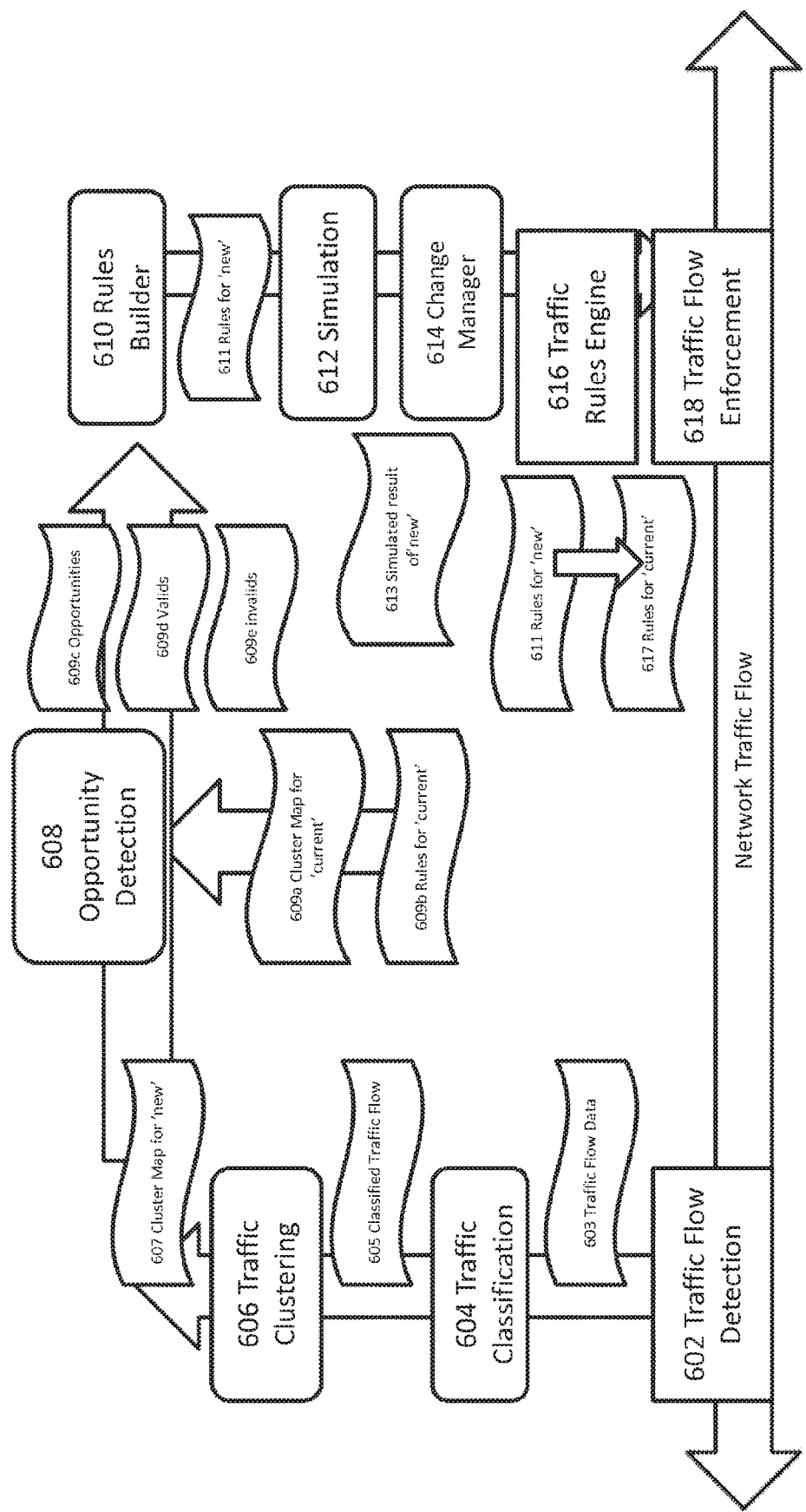
FIG. 6 illustrates an example architecture of a system in accordance with at least some embodiments of the present invention.

FIG. 6 illustrates an example architecture of a system in accordance with at least some embodiments of the present invention. The phases of the illustrated method may be performed in a PCC system 118 or in a control device configured to control the functioning of the PCC system. The system is explained in the following reference to phases of the method of FIG. 2. In an embodiment the system is at least part of policy and charging control system in the communications network.

Initially the system may have a set of rules and cluster maps that have been either manually or automatically defined. On the other hand that the system may not have any predefined rules of cluster maps.

The system comprises a traffic flow detection function 602 for detecting traffic flows from real-life traffic. Traffic flows may be detected on the basis of signaling, traffic probe, Deep Packet Inspection, Call Data Record data, policy control data and other service usage logs. The traffic flow detection function may produce traffic flow data 603.

The system comprises a traffic classification function 604 capable of processing the traffic flow data by analyzing the traffic flow data and adding meta-data of the traffic. In an example the traffic classification may use a combination of machine-learning algorithms and configuration rules to classify and add meta-data of the classification into the raw data stream. In telecommunications networks, Uniform Resource Locator (URL) matching, reverse IP address resolution, payload protocols and known application behaviors all allow determining service class. Also DPI may be utilized in the traffic classification. As a result the traffic classification function produces 'classified traffic flow data' 605.

Examples of traffic classification methods for the traffic classification function comprise Domain Name Server resolution, destination IP address, application layer protocol, UE IP address, UE device type (IMEI, IMSI, MSISDN tuple), Data usage fingerprinting, External reference data such as app store downloads. Classifications in general level: 'video', 'browsing', 'voip/telephony', 'messaging' Detailed application classifications: 'spotify', 'itunes', 'netflix', 'periscope', 'twitter'. Also combinations of the classification methods may be utilized, for example reverse IP lookup to detect the address owner, and to find an application based on e.g. App store developer company to detect application name.

An example of the data usage fingerprinting is that a specific application may be identified by characteristics of the data flow generated by the application. The data flow generated by the application may have for example a certain sequence of data transfer at startup.

The traffic classification function and/or the traffic detection function may serve for performing phase 202.

The system comprises a traffic clustering function 606 for algorithmically clustering the classified traffic flow data such that Segmentation Models, Traffic Cluster Maps may be produced for describing traffic by groups that may be referred to as cluster maps. The clusters group traffic flows according to applications, devices, users, users' behavior. The applications may be the applications executed in the UE and causing traffic that is served in the communications network in the traffic flow. Applications may generate variable amount of data at variable speeds in uplink and/or in downlink. The devices enable clustering traffic according to capabilities of the devices, for example capabilities regarding the data transmission speed. The users enable clustering according to subscriptions of the users. The users' behavior may vary depending on the time of day for example.

These maps describe 'new' 607 state from the system point of view. The 'new' state may be potentially different to a 'current' state of the system. Both the 'new' state and the 'current' state may comprise one or more cluster maps 609a. The current state may also comprise current rules 609b that have been applied to processing traffic flows in the communications network. In an example, when the system is started without cluster maps, the current state does not include any cluster maps. However, after the clustering, the new state includes cluster maps, whereby the new state is different from the current state.

The traffic clustering function may serve for performing phase 206.

The system comprises an opportunity detection function 608 capable of producing information that describes the difference between 'new' and 'current' states. The information that describes difference between the new and current states may comprise information identifying one or more clusters. The information identifying clusters may identify one or more from opportunity clusters 609c, valid clusters 609d and invalid clusters 609e. In an example the information describing difference between the new and current states may be obtained by comparing the clusters in the new state and the cluster in the current state. The comparison may comprise utilizing the current rules 609b for determining whether there exist rules applying to the clusters in the new state. The comparison may result in detecting valid clusters, invalid clusters and new clusters. Valid clusters may be clusters that are present in both new and current states. Invalid clusters may be clusters that are present in the current state but not present in the new state. New clusters may be clusters that have are not present in the current state but present in the new state. The current rules may not apply to the new clusters or the current rules may apply only partially to the new clusters. It should be appreciated that instead or additionally to comparing single cluster maps of the new state and the current state, time series of cluster maps may be compared.

The system comprises rules builder 610 that may be capable of generating one or more new traffic rules 611 on the basis of the information produced by the opportunity detection function. The information produced by the opportunity detection function may comprise traffic clusters for example the opportunity clusters, valid clusters and invalid clusters. The generated rules may comprise rules for the opportunity clusters, valid clusters and the invalid clusters. The generated rules may comprise more than one set of rules, i.e. a plurality of sets of rule.

The opportunity detection function and rules builder may serve for performing phase 208.

The system may comprise a simulation function 612 capable of simulating the generated traffic rules for obtaining a result 613 indicating behavioural effect in the traffic of the communications network. The simulating may comprise utilizing real-life traffic flow data and historical traffic flow data for obtaining the result.

The simulation function may serve for performing the phase 210.

The system may comprise a change manager 614 capable of evaluating the simulation result against one or more performance criteria of the communications network. The performance criteria may comprise an amount of data flow in uplink direction, an amount of data flow in downlink direction, data link usage, charging, and/or other parameter capable of representing characteristics of the communications network.

If the simulation results meet the performance criteria, the generated traffic rules 611 may be put to production by a traffic rules engine 616 and the rules 611 for the new state may be stored as new rules 617 for the current state. A traffic flow enforcement function 618 may operate to apply the rules of the current state. The previous current rules may be stored in history along with cluster maps, simulation results and other data for machine-learning adaptations for example to be used as teaching material for Artificial Intelligence (AI) algorithms.

The change manager, traffic rules engine and traffic flow enforcement function may serve for performing the phases 204, 212 and 214.

When the generated traffic rules comprise a plurality of sets of rules, all the sets may be simulated by the simulation function and all the simulation results may be evaluated against the performance criteria and the set of traffic rules, whose simulation results has the highest performance criteria may be put to production. On the other hand the set of rules having the least impact on the behaviour of the communications from the simulated sets may be put to production.

Figure 7:
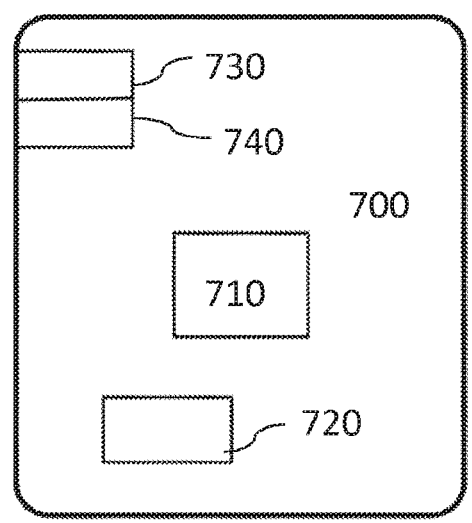
FIG. 7 illustrates an example apparatus capable of supporting at least some embodiments of the present invention.

FIG. 7 illustrates an example apparatus capable of supporting at least some embodiments of the present invention. Illustrated is apparatus 700, which may comprise, for example, a PCC system of FIG. 1, or a gateway connected to the PCC system, or a part of the PCC system or the gateway connected to the PCC system. Comprised in apparatus 700 is processor 710, which may comprise, for example, a single- or multi-core processor wherein a single-core processor comprises one processing core and a multi-core processor comprises more than one processing core. Processor 710 may comprise more than one processor. A processing core may comprise, for example, a Cortex-A8 processing core manufactured by ARM Holdings or a Steamroller processing core produced by Advanced Micro Devices Corporation. Processor 710 may comprise for example a processor or a central processing unit for a computer system. Processor 710 may be means for performing method steps in apparatus 700. Processor 710 may be configured, at least in part by computer instructions, to perform actions.

Apparatus 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise computer instructions that processor 710 is configured to execute. When computer instructions configured to cause processor 710 to perform certain actions are stored in memory 720, and apparatus 700 overall is configured to run under the direction of processor 710 using computer instructions from memory 720, processor 710 and/or its at least one processing core may be considered to be configured to perform said certain actions. Memory 720 may be at least in part comprised in processor 710. Memory 720 may be at least in part external to apparatus 700 but accessible to apparatus 700.

Apparatus 700 may comprise a transmitter 730. Apparatus 700 may comprise a receiver 740. Transmitter 730 and receiver 740 may be configured to transmit and receive, respectively, information in accordance with at least one wired or wireless communications standard. Transmitter 730 may comprise more than one transmitter. Receiver 740 may comprise more than one receiver. Transmitter 730 and/or receiver 740 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Processor 710 may be furnished with a transmitter arranged to output information from processor 710, via electrical leads internal to apparatus 700, to other apparatuses comprised in apparatus 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to apparatus 700, from other devices comprised in apparatus 700. Such a receiver may comprise a serial bus receiver arranged to, for example, receive information via at least one electrical lead from receiver 740 for processing in processor 710. Alternatively to a serial bus, the receiver may comprise a parallel bus receiver.

Processor 710, memory 720, transmitter 730 and/or receiver 740 may be interconnected by electrical leads internal to apparatus 700 in a multitude of different ways. For example, each of the aforementioned apparatuses may be separately connected to a master bus internal to apparatus 700, to allow for the apparatuses to exchange information. However, as the skilled person will appreciate, this is only one example and depending on the embodiment various ways of interconnecting at least two of the aforementioned apparatuses may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

ACRONYMS LIST

| | |
|---|---|
| 3GPP | 3rd Generation Partnership Project |
| AAR | AA-Request |
| AI | Artificial Intelligence |
| app | application |
| BBERF | Bearer Binding and Event Reporting Function |
| CCR | Credit Control Request |
| DPI | Deep Packet Inspection |
| EPC | Evolved Packet Core |
| GPRS | General Packet Radio Service |
| GSM | Global System for Mobile Communications |
| HSS | Home Subscriber Server |
| IMEI | International Mobile Equipment Identity |
| IMSI | International Mobile Subscriber Identity |
| IP | Internet Protocol |
| IP-CAN | IP connectivity Access network |
| IPSec | internet protocol security |
| LTE | Long Term Evolution |
| MSISDN | Mobile Station International Subscriber Directory Number |
| P-GW | Packet Data Network Gateway |
| PCC | Policy and Charging Control |
| PCEF | Policy and Charging Enforcement Function |
| PCRF | Policy and Charging Rules Function |
| QoE | Quality of Experience |
| QoS | Quality of Service |
| SDF | Service Data Flow |
| S-GW | Serving Gateway |
| SMS | Short Message Service |
| UE | User Equipment |
| URL | Uniform Resource Locator |
| WCDMA | wideband code division multiple access |
| WiMAX | Worldwide Interoperability for Microwave Access |
| WLAN | Wireless Local Area Network |

REFERENCE SIGNS LIST

| | |
|---|---|
| 102 | core network |
| 104 | user equipment |
| 106 | external networks and sendees |
| 108, 110 | traffic processing entities |
| 112 | subscriber database |
| 114 | access network |
| 202-214 | Phases of the method of FIG. 2 |
| 302-308 | Phases of the method of FIG. 3 |
| 402-408 | Phases of the method of FIG. 4 |
| 502-508 | Phases of the sequence of FIG. 5 |
| 602 | traffic flow detection function |
| 603 | traffic flow data |
| 604 | traffic classification function |
| 605 | classified traffic flow data |
| 606 | traffic clustering function |
| 607 | Cluster maps for new state |
| 608 | opportunity detection function |
| 609a | Cluster maps for new state |
| 609b | Cluster maps for current state |
| 609c | Opportunity clusters |
| 609d | valid clusters |
| 609e | invalid clusters |
| 610 | rules builder |
| 611 | new traffic rules |
| 612 | simulation function |
| 613 | simulation result |

-continued

| REFERENCE SIGNS LIST | |
|---|---|
| 614 | change manager |
| 616 | traffic rules engine |
| 617 | new rules for the current state |
| 618 | traffic flow enforcement function |
| 700 | apparatus |
| 710 | processor |
| 720 | memory |
| 730 | transmitted |
| 740 | receiver |

The invention claimed is:

1. A system for adaptive traffic processing in a communications network, said system comprising a memory for storing program code and at least one processing core capable of executing the program code to cause:
 detecting traffic flows from real-life traffic;
 applying rules to detected traffic flows;
 performing machine-learning based clustering of the detected traffic flows;
 generating at least one new traffic rule on the basis of one or more generated traffic clusters;
 simulating the generated rules for obtaining a result indicating behavioural effect in the traffic of the communications network;
 evaluating the result against one or more performance criteria of the communications network; and
 applying the generated rules if the performance criteria of the communications network have been met.

2. The system according to claim 1, wherein traffic clustering is performed continuously and one or more previously generated traffic clusters are compared with one or more subsequently generated clusters to determine whether the previously generated traffic clusters include valid clusters or whether the subsequently generated clusters include new clusters.

3. The system according to claim 2, wherein the machine-learning based clustering is adapted on the basis of previously generated traffic clusters and one or more simulation results.

4. The system according to claim 1, wherein the detected traffic flows are clustered into multiple clusters by applying a plurality of sets of weighing parameters to the detected traffic flows.

5. The system according to claim 1, wherein a traffic flow control product is defined on the basis of the generated rules and a service offer for applying the defined traffic flow control product is sent to one or more subscribers of the communications network.

6. The system according to claim 5, wherein the generated rules are applied in response to receiving an acceptance from the subscriber on the service offer.

7. The system according to claim 6, wherein the acceptance from the subscriber on the service offer via one messaging channel is received via another messaging channel.

8. The system according to claim 5, wherein the service offer for the traffic flow control product is sent via a messaging channel selected from a group consisting of:
 Short Message Service,
 push notification,
 in-app messaging,
 email, and
 web page content on subscription management web pages.

9. The system according to claim 1, wherein the system is at least part of policy and charging control system in the communications network.

10. A method for adaptive traffic processing in a communications network, comprising:
 detecting traffic flows from real-life traffic;
 applying rules to detected traffic flows;
 performing machine-learning based clustering of the detected traffic flows;
 generating at least one new traffic rule on the basis of one or more generated traffic clusters;
 simulating the generated rules for obtaining a result indicating behavioural effect in the traffic of the communications network;
 evaluating the result against one or more performance criteria of the communications network; and
 applying the generated rules if the performance criteria of the communications network have been met.

11. The method according to claim 10, wherein traffic clustering is performed continuously and one or more previously generated traffic clusters are compared with one or more subsequently generated clusters to determine whether the previously generated traffic clusters include valid clusters or whether the subsequently generated clusters include new clusters.

12. The method according to claim 11, wherein the machine-learning based clustering is adapted on the basis of previously generated traffic clusters and one or more simulation results.

13. The method according to claim 10, wherein the detected traffic flows are clustered into multiple clusters by applying a plurality of sets of weighing parameters to the detected traffic flows.

14. The method according to claim 10, wherein a traffic flow control product is defined on the basis of the generated rules and a service offer for applying the defined traffic flow control product is sent to one or more subscribers of the communications network.

15. The method according to claim 14, wherein the generated rules are applied in response to receiving an acceptance from the subscriber on the service offer.

16. The method according to claim 15, wherein the acceptance from the subscriber on the service offer via one messaging channel is received via another messaging channel.

17. The method according to claim 14, wherein the service offer for the traffic flow control product is sent via a messaging channel that includes Short Message Service, push notification, in-app messaging, email or web page content on subscription management web pages.

18. A computer program product, comprising a non-transitory computer readable medium having stored thereon a set of computer readable instructions that, when executed, cause a processor to at least perform a method for adaptive traffic processing in a communications network, the method comprising:
 detecting traffic flows from real-life traffic;
 applying rules to detected traffic flows;
 performing machine-learning based clustering of the detected traffic flows;
 generating at least one new traffic rule on the basis of one or more generated traffic clusters;
 simulating the generated rules for obtaining a result indicating behavioural effect in the traffic of the communications network;
 evaluating the result against one or more performance criteria of the communications network; and applying the generated rules if the performance criteria of the communications network have been met.

19. The computer program product according to claim 18, wherein traffic clustering is performed continuously and one or more previously generated traffic clusters are compared with one or more subsequently generated clusters to determine whether the previously generated traffic clusters include valid clusters or whether the subsequently generated clusters include new clusters, wherein a traffic flow control product is defined on the basis of the generated rules and a service offer for applying the defined traffic flow control product is sent to one or more subscribers of the communications.

* * * * *

UNITED STATES PATENT AND TRADEMARK OFFICE
CERTIFICATE OF CORRECTION

| | | |
|---|---|---|
| PATENT NO. | : 10,932,160 B2 | Page 1 of 1 |
| APPLICATION NO. | : 16/467447 | |
| DATED | : February 23, 2021 | |
| INVENTOR(S) | : Juhana Enqvist, Simo Isomaki and Mikko Jarva | |

It is certified that error appears in the above-identified patent and that said Letters Patent is hereby corrected as shown below:

In the Specification

In Column 11, Line 4, after --invalid clusters-- delete "609c." and insert --609e.--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*